United States Patent
Ashwood-Smith (10) Patent No.: US 9,967,183 B2
(45) Date of Patent: May 8, 2018

(54) SOURCE ROUTING WITH ENTROPY-HEADER

(71) Applicant: Huawei Technologies Co., Ltd., Shenzhen (CN)

(72) Inventor: Peter Ashwood-Smith, Gatineau (CA)

(73) Assignee: Huawei Technologies Co., Ltd., Shenzhen (CN)

(*) Notice: Subject to any disclaimer, the term of this patent is extended or adjusted under 35 U.S.C. 154(b) by 70 days.

(21) Appl. No.: 14/136,259

(22) Filed: Dec. 20, 2013

(65) Prior Publication Data
US 2015/0180771 A1 Jun. 25, 2015

(51) Int. Cl.
*H04L 12/721* (2013.01)
*H04L 12/851* (2013.01)
*H04L 12/707* (2013.01)

(52) U.S. Cl.
CPC .............. *H04L 45/72* (2013.01); *H04L 45/24* (2013.01); *H04L 45/34* (2013.01); *H04L 45/566* (2013.01); *H04L 47/2483* (2013.01)

(58) Field of Classification Search
CPC ....... H04L 45/24; H04L 45/34; H04L 45/566; H04L 45/72; H04L 47/2483
See application file for complete search history.

(56) References Cited

U.S. PATENT DOCUMENTS

| | | | |
|---|---|---|---|
| 7,643,467 B2 | 1/2010 | Smith et al. | |
| 2002/0114332 A1 | 8/2002 | Apostolopoulos et al. | |
| 2007/0280247 A1* | 12/2007 | Mera et al. | 370/392 |
| 2008/0159288 A1 | 7/2008 | Nagarajan et al. | |
| 2009/0201811 A1 | 8/2009 | Filsfils et al. | |
| 2010/0054252 A1 | 3/2010 | Fujita et al. | |
| 2013/0166960 A1* | 6/2013 | Das | H04L 43/50 714/47.1 |
| 2013/0223237 A1* | 8/2013 | Hui et al. | 370/250 |
| 2013/0286846 A1 | 10/2013 | Atlas et al. | |
| 2015/0003255 A1* | 1/2015 | Frost | H04L 43/12 370/238 |

(Continued)

FOREIGN PATENT DOCUMENTS

| | | |
|---|---|---|
| CN | 101534573 A | 9/2009 |
| CN | 101729135 A | 6/2010 |

OTHER PUBLICATIONS

Foreign Communication From A Counterpart Application, PCT Application No. PCT/CN2014/094503, International Search Report dated Mar. 31, 2015, 7 pages.

(Continued)

*Primary Examiner* — Alex Skripnikov
*Assistant Examiner* — Nicole King
(74) *Attorney, Agent, or Firm* — Conley Rose, P.C.

(57) ABSTRACT

A method implemented for providing a source of entropy in source routing, the method comprising receiving a source routing packet that comprises an entropy-header, wherein the entropy-header comprises an entropy field and a list of identifiers (IDs), determining a next hop ID from the list of IDs, determining whether the next hop ID identifies a plurality of routes used to reach a next hop node, selecting a first route from the plurality of routes using the entropy field, and transmitting the source routing packet via the first route, wherein the list of IDs indicates the route used to transport the source routing packet from a source to a destination.

19 Claims, 3 Drawing Sheets

(56) References Cited

U.S. PATENT DOCUMENTS

2015/0030020 A1* 1/2015 Kini .................. H04L 45/28
  370/389
2015/0109907 A1* 4/2015 Akiya ................ H04L 47/125
  370/229

OTHER PUBLICATIONS

Foreign Communication From A Counterpart Application, PCT Application No. PCT/CN2014/094503, Written Opinion dated Mar. 31, 2015, 4 pages.
"Draft Standard for Local and Metropolitan Area Networks—Virtual Bridged Local Area Networks—Amendment: Equal Cost Multiple Paths (ECMP)," IEEE P802.1Qbp/D1.6, Jul. 22, 2013, 123 pages.
Kompella, K., et al., "The Use of Enthropy Labels in MPLS Forwarding," RFC 6790, Nov. 2012, 25 pages.
Filsfils, C., Ed., et al., "Segment Routing Architecture," draft-filsfils-rtgwg-segment-routing-01, Oct. 21, 2013, 28 pages.
Filsfils, C., Ed., et al., "Segment Routing Use Cases," draft-filsfils-rtgwg-segment-routing-use-cases-02, Oct. 21, 2013, 36 pages.
Filsfils, C., Ed., et al., "Segment Routing Centralized Egress Peer Engineering," draft-filsfils-spring-segment-routing-central-epe-01, May 26, 2014, 19 pages.
Filsfils, C., Ed., et al., "Segment Routing interoperability with LDP," draft-filsfils-spring-segment-routing-ldp-interop-00, Oct. 20, 2013, 17 pages.
Filsfils, C., Ed., et al., "Segment Routing with MPLS data plane," draft-filsfils-spring-segment-routing-mpls-00, Oct. 20, 2013, 11 pages.
Francois, P., et al., "Topology Independent Fast Reroute using Segment Routing," draft-francois-segment-routing-ti-lfa-00, Nov. 18, 2013, 10 pages.
Francois, P., et al., "Segment Routing Fast Reroute," draft-francois-sr-frr-00, Jul. 1, 2013, 12 pages.
Filsfils, C., Ed., et al., "Segment Routing with MPLS data plane," draft-ietf-spring-segment-routing-mpls-02, Oct. 17, 2015, 14 pages.
Jeganathan, J., et al., "RSVP-TE LSP egress fast-protection," draft-minto-rsvp-lsp-egress-fast-protection-03, Nov. 3, 2013, 14 pages.
Previdi, S., Ed., et al., "IS-IS Extensions for Segment Routing," draft-previdi-isis-segment-routing-extensions-04, Oct. 21, 2013, 27 pages.
Psenak, P., Ed., et al., "OSPF Extensions for Segment Routing," draft-psenak-ospf-segment-routing-extensions-03, Oct. 18, 2013, 29 pages.
Psenak, P., Ed., et al., "OSPFv3 Extensions for Segment Routing," draft-psenak-ospf-segment-routing-ospfv3-extension-00, Oct. 18, 2013, 25 pages.
Sivabalan, S., et al., PCEP Extensions for Segment Routing, draft-sivabalan-pce-segment-routing-02, Oct. 16, 2013, 18 pages.
Estrin, D., et al., "Source Demand Routing: Packet Format and Forwarding Specification (Version 1)," RFC 1940, May 1996, 27 pages.
Bradner, S., et al., "Key words for use in RFCs to Indicate Requirement Levels," RFC 2119, Mar. 1997, 3 pages.
Deering, S., et al., "Internet Protocol, Version 6 (IPv6) Specification," RFC 2460, Dec. 1998, 39 pages.
Rosen, E., et al., "Multiprotocol Label Switching Architecture," RFC 3031, Jan. 2001, 61 pages.
Kompella, K., et al., "Label Switched Paths (LSP) Hierarchy with Generalized Multi-Protocol Label Switching (GMPLS) Traffic Engineering (TE)," RFC 4206, Oct. 2005, 14 pages.
Psenak, P., et al., "Multi-Topology (MT) Routing in OSPF," RFC 4915, Jun. 2007, 20 pages.
Abley, J., et al., "Deprecation of Type 0 Routing Headers in IPv6," RFC 5095, Dec. 2007, 7 pages.
Przygienda, T., et al., "M-ISIS: Multi Topology (MT) Routing in Intermediate System to Intermediate Systems (IS-ISs)," RFC 5120, Feb. 2008, 14 pages.
Chen, M., et al., "ISIS Extensions in Support of Inter-Autonomous System (AS) MPLS and GMPLS Traffic Engineering," RFC 5316, Dec. 2008, 19 pages.
Jork, M., et al., "LDP IGP Synchronization," RFC 5443, Mar. 2009, 7 pages.
Kini, S., Ed., et al., "LDP IGP Synchronization for Broadcast Networks," RFC 6138, Feb. 2011, 9 pages.
Lindem, A., et al., "OSPFv2 Multi-Instance Extensions," RFC 6549, Mar. 2012, 9 pages.
Previdi, S., Ed., et al., "IS-IS Multi-Instance," RFC 6822, Dec. 2012, 14 pages.
Hopps, C., "Analysis of an Equal-Cost Multi-Path Algorithm," RFC 2992, Nov. 2000, 10 pages.
Foreign Communication From A Counterpart Application, European Application No. 14873096.3, Extended European Search Report dated Sep. 23, 2016, 9 pages.

* cited by examiner

SOURCE ROUTING WITH ENTROPY-HEADER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Source routing is a protocol that partially or completely specifies a route that a packet may travel via a network within a source route header. The source route header may contain a strict list or a loose list of links and/or nodes to traverse. The strict list may explicitly list all of the links and/or nodes a packet may be transported over. Alternatively, the loose list may specify one or more links and/or nodes that the packet may need to traverse through to reach a destination. A loose list may not include all the links and/or nodes that a packet may traverse through to reach the destination. As such, additional routing decisions may be used to route the packet through one intermediate point and to another intermediate point. Implementing source routing may simplify data forwarding network nodes and reduce routing time and latency when compared to using a forwarding table. Instead of performing lookup functions using the forwarding table, a network node (e.g. router) uses the routing information within the source route header to forward the data packet.

Load balancing may be used to route packets across multiple paths. For instance, load balancing may ease capacity planning and absorb traffic surges by spreading traffic surges across multiple paths. Load balancing may also offer alternate paths and provide better resilience against link and/or node failures. An important constraint when performing load balancing is to map packets that belong to a given flow over the same path (e.g. the same exact sequence of links across the network). Mapping packets within the same flow over the same path avoids jitter, latency, and reordering issues. One method used to map the packets from the same flow to the same path is to input keys obtained from a packet's header into a load balancing function (e.g. a hashing function). The load balancing function subsequently attempts to assign all packets corresponding to a particular flow to the same path. Thus, the load balancing function attempts to evenly distribute packets amongst the multiple paths by assigning different flows to different paths.

In some instances, a network node may receive a source routing packet comprising a link identifier that corresponds to a plurality of physical links between the network node and the next hop network node. To prevent packet re-ordering, the network node may not randomly choose one of the physical links (e.g. using a round robin algorithm) identified within the source route header and subsequently transmit the packet over one of the randomly chosen physical links. Typically, the network node may use a load balancing function to route the source routing packet to one of the physical links using information from the payload. Unfortunately, performing the load balancing function may be relatively complex and thereby increases processing time at the network node. For instance, the payload may vary in distance from the list of links for a variable-sized source route header. Moreover, the network node may need to determine the exact format of the payload to implement the load balancing function.

SUMMARY

In one example embodiment, the disclosure includes a network node to select a next hop link using a source of entropy within a source routing packet. The source routing packet comprises an entropy-header that provides an entropy field and a list of identifiers (IDs). The method may route a source routing packet based on one of the routes within the list of IDs. The link and/or node used to route the source routing packet may be identified by the next hop ID. When the next hop ID identifies a plurality of routes used to reach a next hop node, the entropy field is used to select one of the routes to forward the source routing packet.

In another example embodiment, the disclosure includes a network node that determines whether an ID identifies an ambiguous link or node. An ID identifies an ambiguous link or node when the ID corresponds to a plurality of routes used to transport a source routing packet from the node to a next hop node. If the link ID identifies an ambiguous link or node, then the network node assigns one of the routes to forward the source routing packet based on an entropy value within the source routing packet. The entropy value and the ID is located within a header of the source routing packet, and the ID is used to route the source routing packet from the node to the next hop node. The entropy value indicates a source of randomness to route the source routing packet.

In yet another example embodiment, the disclosure includes a network node configured to determine whether a current ID located within the entropy-header identifies more than one next hop routes. The network node selects one of the next hop routes as a forwarding route using an entropy field within the entropy-header when the current ID identifies more than one next hop routes. Alternatively, the network node assigns a single route identified by the current ID as the forwarding route when the current ID identifies one next hop route. Afterwards, the network node forwards the source routing packet over the forwarding route to reach a next hop node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more example embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various example embodiments that utilize source routing with an entropy-header. The entropy-header may comprise an entropy field that represents the entropy or source of randomness used to distribute packets amongst multiple next interfaces to reach the packets' destination. To avoid packet mis-ordering, entropy may be a function of a packet flow such that packets within the same flow have the same entropy value. The entropy field may comprise an entropy value generated from payload information at the time an ingress node encapsulates the entropy-header. The entropy field may be encapsulated before a list of link IDs and/or some other fixed location within the entropy-header. The entropy value in conjunction with source routing forwarding operations, nodal source of randomization, and/or other local sources of randomization may be used to select a single link to reach the next hop when the link ID identifies an ambiguous link or node.

Figure 1:
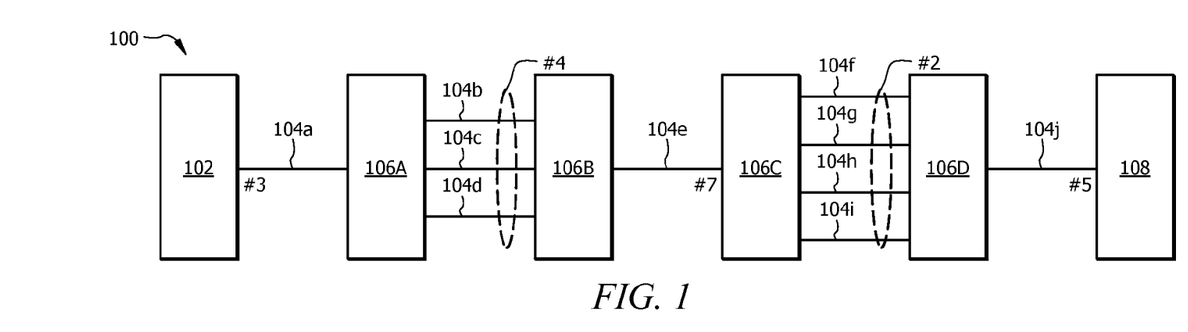
FIG. 1 is a schematic diagram of an example embodiment of a source routing network where example embodiments of the present disclosure may operate.

FIG. 1 is a schematic diagram of an example embodiment of a source routing network 100 where example embodiments of the present disclosure may operate. The source routing network 100 may be any network configured to use link based source routing. For example, the source routing network 100 may include, but is not limited to, Internet Protocol (IP) networks, Multiprotocol Label Switching (MPLS) networks, Ethernet networks, Software Defined Networks (SDNs), etc. Source routing network 100 may be a network comprising one or more local area networks (LANs), virtual networks, and/or wide area networks (WANs). Link based source routing may be used to direct at least some packets traversing through the source routing network 100 via a tunnel from a source to a destination. FIG. 1 illustrates that the source routing network 100 may comprise an ingress node 102, intermediate nodes 106A-D, and an egress node 108.

Ingress node 102, intermediate nodes 106A-D, and egress node 108 may be routers, switches, bridges, and/or any other network device capable of transporting data packets through source routing network 100. Ingress node 102, intermediate nodes 106A-D, and egress node 108 may be coupled together with links 104a-j. Links 104a-j may be physical links, such as fiber optic links, electrical links, and wireless links, or indirect connections, such as logical connections and/or physical links with intervening nodes. Links 104a-j may be arranged as a single link, in a group of parallel links between two nodes (e.g. adjacent nodes), and/or various combinations thereof used to transport data within source routing network 100. Links 104a-j may be generally referred to as links 104 throughout this disclosure.

Ingress node 102 may initially receive an incoming packet that corresponds to a particular flow. For example, the flow may correspond to a Transmission Control Protocol (TCP) session. The ingress node 102 may be configured to transport the incoming packet over a source routing tunnel. The ingress node 102 may receive the incoming packet from an external node located outside the source routing network 100. To implement source routing, the ingress node 102 may determine a route from a source and a destination and subsequently encapsulate an entropy-header that comprises an entropy field and a source route header to form a source routing packet. In one example embodiment, the ingress node 102 may employ well-known routing techniques for generating the route for the source routing packet, such as shortest path, distance, cost, link bandwidth, latency, Interior Gateway Protocol (IGP), and/or Border Gateway Protocol (BGP) to determine the optimal path. As one of ordinary skill in the art will know, the preceding examples are non-inclusive and any suitable routing technique may be employed by the ingress node 102 in determining the optimal path for the source routing packet. In another example embodiment, the ingress node 102 may obtain the routing information from another node, such as a centralized controller (e.g. SDN controller) and/or a management entity. After encapsulation, the entropy-header may represent the header section of the source routing packet and the received incoming packet may be located within the payload section of the source routing packet.

The entropy field may comprise an entropy value that may be used as a source of randomness to select one of the links that correspond to an ambiguous link. In one example embodiment, links 104 may represent physical links. An ambiguous link exists when a link ID within the source route header identifies a plurality of links 104 (e.g. more than one link 104) between a node (e.g. intermediate node 106A) and the next hop network node (e.g. intermediate node 106B). In FIG. 1, link IDs #4 and #2 may be classified as ambiguous links. Specifically, link ID #4 identifies three different links 104b-d and link ID #2 identifies four different links 104f-i. In one embodiment, links 104b-d and 104f-i may be parallel links. The entropy value may be a function of the payload information (e.g. received incoming packet prior to encapsulation) of the source routing packet.

In one example embodiment, the link IDs may represent node identifiers (e.g. a loose list of nodes) that identify an intervening node used to reach intermediate nodes 106A-D and/or egress node 108. Recall that in one example embodiment, at least some of the links 104 may be indirect connections, such as logical connections and/or physical links with intervening nodes. For example, links 104b-d may each comprise an intervening node (not shown in FIG. 1) that is located between intermediate node 106A and intermediate node 106B. The intervening node may be interconnected with intermediate nodes 106A and 106B via one or more physical links. The link IDs may identify the intervening nodes as nodes used to reach intermediate node 106B from intermediate node 106A. In this instance, link ID #4 may be classified as an ambiguous node because link ID #4 may identify multiple intervening nodes used to reach intermediate node 106B from intermediate node 106A. For ease of discussion, the term link ID(s) within a source route header is understood throughout the disclosure as identifiers that identify link(s) and/or node(s) used to reach a next hop node.

The source route header may comprise a list of link IDs used to route the incoming packet through source routing network 100. In one example embodiment, the list of link IDs may be a strict list that explicitly lists the links used to route the incoming packet through source routing network 100. Using FIG. 1 as an example, the list of link IDs may include [link ID #3, link ID #4, link ID #7, link ID #2, and link ID #5] to transport the incoming packet from a source (e.g. ingress node 102) to a destination (e.g. egress node 108). Link ID #3 identifies link 104a; link ID #4 identifies links 104b-d; link ID #7 identifies link 104e; link ID #2 identifies links 104f-i; and link ID #5 identifies link 104j. After encapsulation, the ingress node 102 may send (e.g. transmit) the source routing packet over link 104a, which is identified by link ID #3. As shown in FIG. 1, links 104b-d and 104f-i may be links used to reach the next hop. In another embodiment, the list of link IDs may be a loose list that identifies the links and/or nodes that a source routing packet may need to traverse over. A loose list may include a subset of all the link IDs used to route a source routing packet from a source to a destination. In other words, the loose list may identify some, but not all of the links and/or nodes in a full end to end list. As such, a loose list does not explicitly identify all of the links and/or nodes within a path for the source routing packet.

Intermediate node 106A may receive the source routing packet and determine from the source route header to forward the source routing packet via a link 104 identified by link ID #4 to reach the next hop. The intermediate node 106A may determine that link ID #4 identifies an ambiguous link and/or node (e.g. identifies more than one link 104 and/or node that can be used to reach the next hop), and may assign one of the links 104b-d to transport the source routing packet to the intermediate node 106B. Intermediate node 106A may assign one of the links 104b-d by using the entropy value from the entropy field, a source routing forwarding operation (e.g. the link ID #4), a nodal source of randomization, and/or local sources of randomization. Intermediate node 106A may assign other source routing packets from the same flow to the same link 104 to avoid re-ordering of source routing packets. For example, if the intermediate node 106A assigns the source routing packet to link 104b, all other source routing packets associated within the same flow will be routed over link 104b. Once assigning a link 104 (e.g. link 104b), intermediate node 106A may forward the source routing packet to intermediate node 106B via the assigned link 104.

After receiving the source routing packet, intermediate node 106B may forward the source routing packet via the link 104 identified by link ID #7 (e.g. link 104e) to reach the intermediate node 106C. For intermediate node 106B, because the link ID #7 does not identify an ambiguous link, and instead identifies a single link, the entropy value may not be used in selecting link 104e. Once intermediate node 106C receives the source routing packet, the intermediate node 106C may assign one of the links 104f-i to transmit the source routing packet over. Intermediate node 106C may assign a link 104 similar to how intermediate node 106A assigned a link 104 when the link ID identifies an ambiguous link. Intermediate node 106C may subsequently transmit the source routing packet over the selected link (e.g. 104g) to reach intermediate node 106D. Intermediate node 106D may then transmit the source routing packet to egress node 108 via link 104j, which is identified by link ID #5. The egress node 108 may decapsulate the source routing packet by removing the entropy-header and may subsequently transmit the packet outside the source routing network 100.

As one of ordinary skill in the art is aware, although the foregoing discussion was directed toward a single flow from a source to a destination, the disclosed technique is not limited to that application and may instead apply equally to a plurality of other paths and/or flows within the source routing network 100. Moreover, source routing network 100 may encompass different network topologies and layouts, all of which are intended to be encompassed by this disclosure. The use and discussion of a single flow and layout is served solely to facilitate ease of description and explanation.

Figure 2:
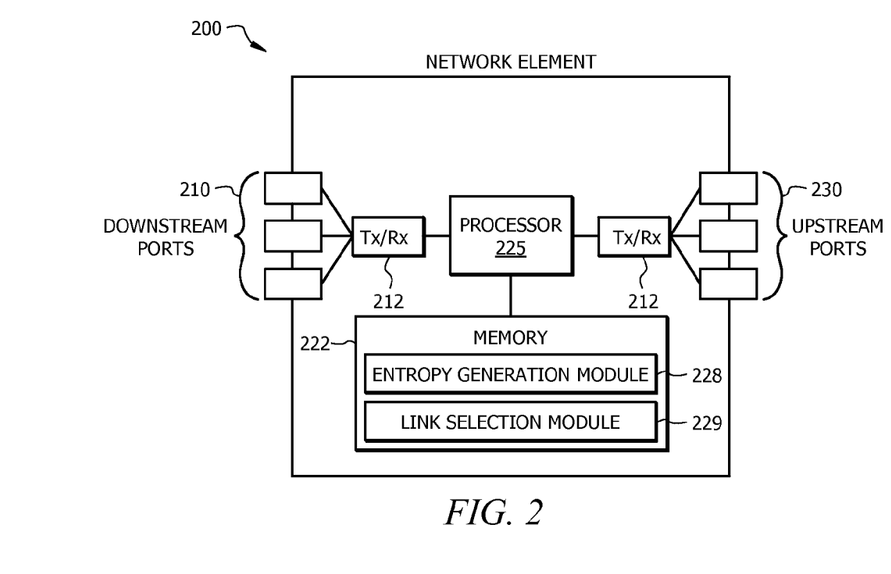
FIG. 2 is a schematic diagram of an example embodiment of a network element.

At least some of the features/methods described in the disclosure may be implemented in a network element. For instance, the features/methods of the disclosure may be implemented using hardware, firmware, and/or software installed to run on hardware. The network element may be any device that transports data through a network, e.g. a switch, router, bridge, server, client, etc. FIG. 2 is a schematic diagram of an embodiment of a network element 200, which may be any device that transports and/or processes source routing packets, such as ingress node 102 and intermediate nodes 106A-D shown in FIG. 1. The network element 200 may also be configured to generate the entropy value and select a link when the link ID identifies an ambiguous link or node as described in methods 400 and 500 in FIGS. 4 and 5, respectively.

The network element 200 may comprise one or more downstream ports 210 coupled to a transceiver (Tx/Rx) 212, which may be transmitters, receivers, or combinations thereof. The Tx/Rx 212 may transmit and/or receive frames from other nodes via the downstream ports 210. Similarly, the network element 200 may comprise another Tx/Rx 212 coupled to a plurality of upstream ports 230, wherein the Tx/Rx 212 may transmit and/or receive frames from other nodes via the upstream ports 230. The downstream ports 210 and/or upstream ports 230 may include electrical and/or optical transmitting and/or receiving components.

A processor 225 may be coupled to the Tx/Rx 212 and be configured to process the frames and/or determine which nodes to send the frames. The processor 225 may comprise one or more multi-core processors and/or memory modules 222, which may function as data stores, buffers, etc. The processor 225 may be implemented as a general processor or may be part of one or more application specific integrated circuits (ASICs) and/or digital signal processors (DSPs). Although illustrated as a single processor, the processor 225 is not so limited and may comprise multiple processors. The processor 225 may be configured to implement any of the schemes described herein, including methods 400 and 500 as described in FIGS. 4 and 5, respectively.

Memory module 222 may be coupled to the processor 225 and may be non-transitory mediums configured to store various types of data. Memory module 222 may comprise memory devices including secondary storage, read only memory (ROM), and random access memory (RAM). The secondary storage is typically comprised of one or more disk drives, solid-state drives (SSDs), and/or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The memory module 222 may be used to house the instructions for carrying out the system and methods described herein, e.g. ingress node 102 and/or intermediate nodes 106A-D, etc. In one example embodiment, the memory module 222 may comprise an entropy generation module 228 (e.g. ingress node 102) that may be implemented on the processor 225. Alternately, the entropy generation module 228 may be implemented directly on the processor 225. The entropy generation module 228 may be configured to generate the entropy value used to select a single link when the link ID identifies an ambiguous link or node. During entropy generation, the entropy generation module 228 may generate an entropy value based on the payload information of the source routing packet. The entropy value may be generated from the payload using a variety of methods that include but are not limited to performing an addition function, multiplication function, and/or cyclic redundancy check (CRC) (e.g. CRC-16 or CRC-32) using the payload information of the source routing packet. In another example embodiment, the memory module 222 may comprise a link selection module 229 that assigns a link to forward the source routing packet based on the entropy value. Generating the entropy value and assigning a link for an ambiguous link or node will be discussed in more detail in FIGS. 4 and 5.

It is understood that by programming and/or loading executable instructions onto the network element 200, at least one of the processor 225, the cache, and the long-term storage are changed, transforming the network element 200 in part into a particular machine or apparatus, e.g. a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
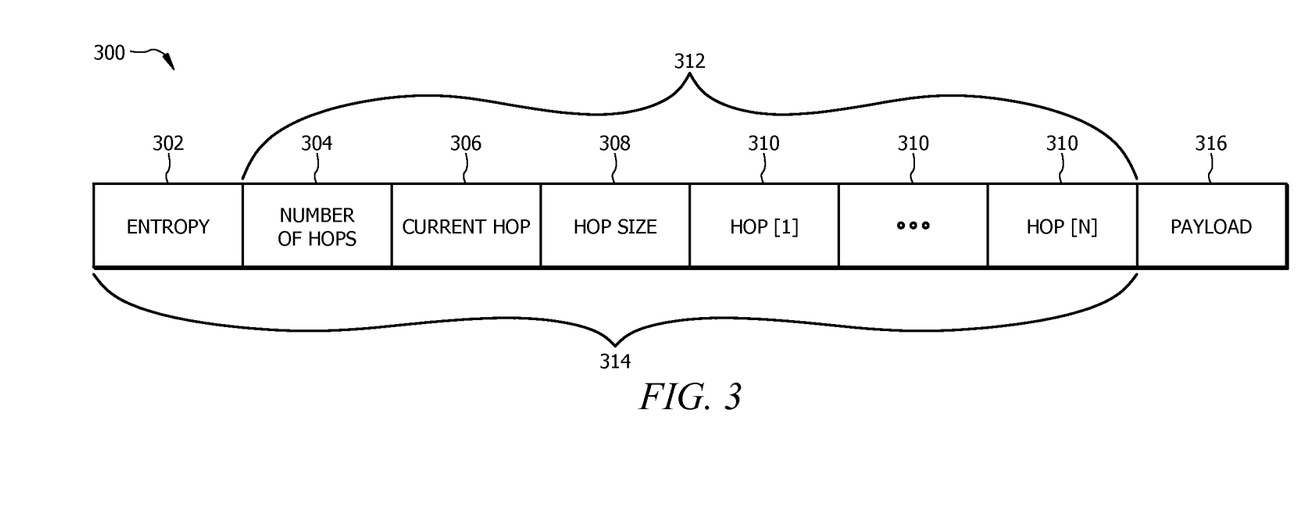
FIG. 3 is a schematic diagram of an example embodiment of a source routing packet.

FIG. 3 is a schematic diagram of an example embodiment of a source routing packet 300. The source routing packet 300 may be used in various example embodiments that implement the techniques disclosed herein, e.g. the source routing network 100. The source routing packet 300 may comprise an entropy-header 314 and a payload 316. The entropy-header 314 may comprise the entropy field 302 and a source route header 312. The payload 316 may comprise the original incoming packet received prior to encapsulating the entropy-header 314. For example, if the incoming packet is an IP packet, the payload 316 may comprise the IP header and payload information within the IP packet. Specifically, the IP header may comprise the source IP, the destination IP, packet type, source port, and destination port.

As shown in FIG. 3, the entropy field 302 may be encapsulated before the source route header 312. By placing the entropy field 302 in front of the source route header 312, a network node (e.g. intermediate nodes 106A-D in FIG. 1) may not need to look within the payload 316 to generate a source of randomness and/or look at the end of a packet for the MPLS entropy label. The entropy field 302 may comprise an entropy value that is used as a source of randomness to select a link when a link ID identifies an ambiguous link or node. Typically, the length of the entropy field 302 may range from about 16 bits to about 20 bits. Other embodiments may use different bit lengths depending on packet size constraints and desired entropy or randomness when performing load balancing. The smaller the length of the entropy field, the less entropy, and thus a more uneven distribution of the data traffic amongst the parallel links of the ambiguous link. The larger the length of the entropy field, the more entropy, and thus a more even distribution of data traffic of the links. The entropy value within entropy field 302 may be a flow-wide unique value that is the same for source routing packets 300 that belong to the same flow.

The source route header 312 may comprise a number of hops field 304, a current hop field 306, a hop size field 308, and hop field [1] 310 to hop field [N] 310. In one example embodiment, the number of hops field 304, the current hop field 306, the hop size field 308, and hop field [1] 310 to hop field [N] 310 may each be about 8 bits in length. The number of hops field 304 indicates the number of hop fields 310 within the source route header 312. In other words, the number of hops field 304 may indicate the number of hops used to route the source routing packet 300. Using FIG. 3 as an example, the number of hop fields 310 may be about N, where N is an integer. The current hop field 306 may indicate the current hop (e.g. hop [2] field 310) within the path. The current hop field 306 may act as a pointer to track which hop field 310 may be used to determine the link ID. The hop size field 308 may indicate the number of bits used for each hop field 310. For example, the hop size field 308 may indicate that each hop field 310 is about 8 bits long. In one example embodiment, the hop fields 310 may represent a strict list of link IDs (e.g. link ID #2 in FIG. 1) and/or network nodes used to forward the source routing packet 300. Hop field [1] 310 may represent the link ID used to implement the first hop from the source (e.g. ingress node) and/or the next hop network node. Hop field [N] 310 may represent the link ID used to implement the last hop to reach the destination and/or the destination node. In another embodiment, the hop fields 310 may represent a loose list of link IDs and/or network nodes.

The current hop field 306 within the source route header 312 may be updated as the source routing packet 300 traverses through a source routing network. Using FIG. 1 as an example, when intermediate node 106A receives the source routing packet 300 from ingress node 102, the current hop field 306 may point to hop field [1] 310, which may comprise the link ID #3. After receiving the source routing packet 300, intermediate node 106A may increment the current hop field 306 by one to point to hop field [2] 310, which represents link ID #4. The current hop field 306 continues to be updated to point to the correct hop field 310 at each intermediate node 106 until the source routing packet reaches its destination (e.g. egress node 108).

Figure 4:
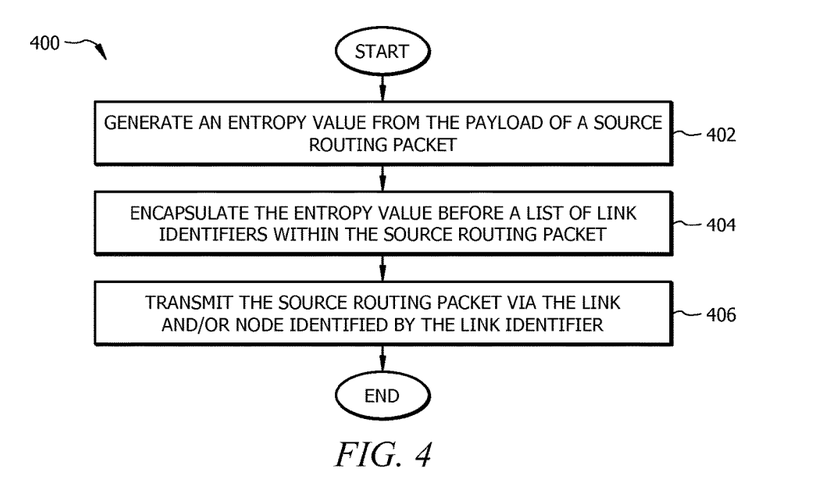
FIG. 4 is a flowchart of an example embodiment of a method used for generating and encapsulating an entropy value for a source routing packet.

FIG. 4 is a flowchart of an example embodiment of a method 400 used for generating and encapsulating an entropy value for a source routing packet. Method 400 may be implemented at a tunnel ingress node, such as ingress node 102 described in FIG. 1. At step 402, method 400 may generate an entropy value from the payload of a source routing packet. The entropy value may be randomly generated by performing a variety of random number generating functions on the payload content, such as implementing an addition and/or multiplication operation, a CRC-16, and/or a CRC-32. A unique entropy value may be generated for each flow. Thus, source routing packets corresponding to different flows may be encapsulated with different entropy values, and source routing packets from the same flow may be assigned the same entropy value. After completing step 402, method 400 may move to block 404 and encapsulate the entropy value before a list of link IDs within the source routing packet. In other words, in one example embodiment, the entropy value may be the outer most field within the source routing packet. As shown below in Table 1, the entropy value may be a function of the payload and may be encapsulated before the source route header:

TABLE 1

At tunnel ingress node:
    Entropy = F(Payload)
    Add Source Route Header
    { NumHops, CurHop=1, HopSize, Hop[1],Hop[2]...}

Table 1 represents pseudo-code that may be used to generate an entropy value and encapsulate the entropy-header within a source routing packet. F(Payload) represents a function (e.g. CRC-16) that may be applied to at least some of the data within the payload. For example, if prior to encapsulation the data packet is an IP packet, the function may be applied to the source IP address, the destination IP address, the packet type field, source port field, and/or destination port field to generate the entropy value. Method 400 may then proceed to block 406 and transmit the source routing packet via the link and/or node identified by the link ID. Recall that in FIG. 3, the current hop field 306 may point to the correct hop field 310 that contains the link ID.

Figure 5:
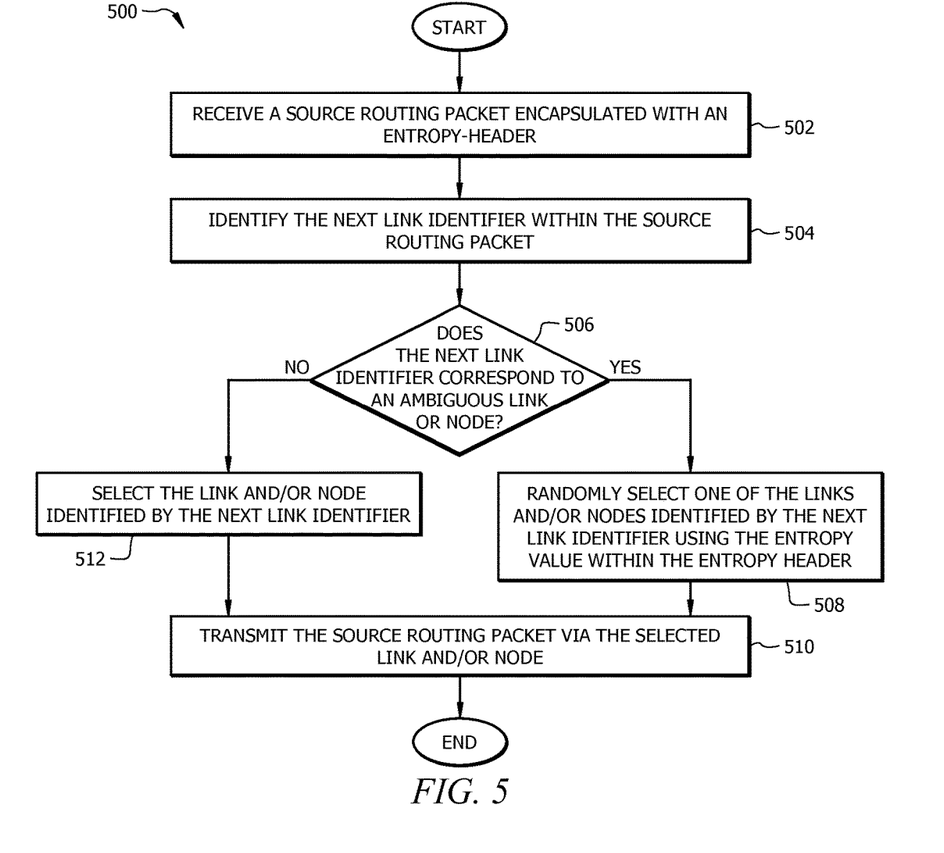
FIG. 5 is a flowchart of an example embodiment of a method used to select a link when the link ID identifies an ambiguous link or node.

FIG. 5 is a flowchart of an example embodiment of a method 500 used to select a link when the link ID identifies an ambiguous link or node. Method 500 may be implemented at a tunnel ingress node and/or an intermediate node, such as ingress node 102 and/or intermediate nodes 106A-D. At step 502, method 500 may receive a source routing packet encapsulated with an entropy-header. Method 500 may then proceed to step 504 and identify the next link ID within the source routing packet. Recall that in FIG. 3, the current hop field 306 may be a pointer that points to one of the hop fields 310. At step 504, method 500 may increment the current hop field 306 by about one such that the current hop field 306 points to the hop field 310 that contains the next link ID.

Method 500 may continue to step 506 and determine whether the next link ID corresponds to an ambiguous link or node. Method 500 may determine that the next link ID identifies an ambiguous link or node when more than one link or node may be used to reach the next hop. If method 500 determines that the link ID corresponds to an ambiguous link or node, then method 500 moves to step 508. At step 508, method 500 may randomly select one of the links and/or nodes identified by the next link ID using the entropy value within the entropy-header. In one example embodiment, method 500 may also use source routing forwarding operations, nodal source of randomization, and/or other local sources of randomization to randomly select one of the links and/or nodes. Afterwards, method 500 may proceed to step 510 and transmit the source routing packet via the selected link and/or node. Returning back to step 506, if the next link ID does not correspond to an ambiguous link or node, then method 500 may proceed to step 512 and select the link and/or node identified by the next link ID. At step 512, the next link ID corresponds to only one link and/or node, and thus is not ambiguous. After step 512, method 500 may move to step 510.

Table 2, shown below, provides pseudo-code that may be used to implement method 500:

TABLE 2

<At intermediate node:
    Next Link = Hop[CurHop++]
    If (NextLink.isAmbiguous( ))
        RealLink = Disambiguate(NextLink, Entropy, NodeRandomizer)
        forward(RealLink)
    Else
        forward(NextLink)

As shown above, when an intermediate node receives a source routing packet, the next link ID is obtained from a hop field within the source routing packet. The intermediate node uses the hop field that is equal to the current hop field incremented by one. The intermediate node then determines whether the next link ID is ambiguous. If the next link ID is determined to be ambiguous, then a disambiguate function may be used to determine the real link. The disambiguate function may use the entropy field, the next link ID and a local node randomizer corresponding to the intermediate node to obtain the real link or node. Once the intermediate node determines the real link or node, the intermediate node may forward the source routing packet to the next hop node via the real link or node. In instances where the next link ID is determined to be not ambiguous, the intermediate node may forward the source routing packet via the link or node identified by the next link ID.

At least one example embodiment is disclosed and variations, combinations, and/or modifications of the example embodiment(s) and/or features of the example embodiment(s) made by a person having ordinary skill in the art are within the scope of the disclosure. Alternative example embodiments that result from combining, integrating, and/or omitting features of the example embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are example embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

I claim:

1. A method implemented for providing a source of entropy in source routing, the method comprising:
   receiving a source routing packet that comprises an entropy-header, wherein the entropy-header comprises an entropy field and a list of identifiers (IDs), wherein the list of IDs indicates hops used to transport the source routing packet from a source to a destination, and wherein the entropy field is located at a beginning of the entropy-header of the source routing packet when the source routing packet is transmitted;
   determining a next hop ID from the list of IDs;
   determining that the next hop ID identifies a plurality of routes used to reach a next hop node;
   selecting a first route from the plurality of routes using an entropy value in the entropy field, wherein the entropy value is generated based on a payload of the source routing packet using a function having at least one mathematical operation over a subset of bits in the payload; and
   transmitting the source routing packet via the first route.

2. The method of claim 1, wherein the entropy field is located before the list of IDs within the entropy-header.

3. The method of claim 1, wherein the next hop ID is used to select the first route, and wherein the plurality of routes are at least one of a plurality of parallel links, and a plurality of nodes used to reach the next hop node.

4. The method of claim 1, wherein a local source of randomness is used to select the first route.

5. The method of claim 1, wherein the source routing packet belongs to a flow that transports packets from the source to the destination, and wherein the method further comprises receiving a second source routing packet belonging to the same flow and selecting a first link to transport the second source routing packet.

6. The method of claim 5, wherein the second source routing packet comprises a second entropy field that has a same entropy value as the entropy field.

7. The method of claim 1, wherein the source routing packet further comprises the payload, and wherein the entropy field is generated by applying a random number generator function to the payload.

8. The method of claim 1, wherein the source routing packet further comprises the payload, and wherein the payload is not used directly as a source of randomness to select the first route when the next hop ID identifies the plurality of routes.

9. The method of claim 1, wherein an end of the source routing packet is not used as a source of randomness to select the first route when the next hop ID identifies the plurality of routes.

10. The method of claim 1, wherein the entropy value is generated based on the payload of the source routing packet using at least one of an addition function, a multiplication function, and a cyclic redundancy check.

11. A computer program product comprising computer executable instructions stored on a non-transitory computer readable medium that when executed by a processor causes a node to perform the following:
   determine that an identifier (ID) identifies a plurality of routes used to transport a source routing packet from the node to a next hop node; and
   assign one of the routes to forward the source routing packet based on an entropy value within the source routing packet,
   wherein the entropy value and the ID are located within a header of the source routing packet, wherein the header comprises an entropy field, wherein the entropy field is located at a beginning of the header of the source routing packet when forwarded, wherein the ID is used to route the source routing packet from the node to the next hop node, wherein the entropy value is generated based on a payload of the source routing packet using a function having at least one mathematical operation over a subset of bits in the payload, and wherein the entropy value indicates a source of randomness to route the source routing packet.

12. The computer program product of claim 11, wherein the entropy value is located before the ID within the header of the source routing packet.

13. The computer program product of claim 11, wherein the instructions when executed by the processor causes the node to receive a second source routing packet that comprises a second entropy value, and wherein the entropy value and the second entropy value are the same when the source routing packet and the second source routing packet belongs in the same flow.

14. The computer program product of claim 11, wherein the ID is part of a list of IDs located within the header of the source routing packet, and wherein the list of IDs identify at least one of a plurality of parallel links, and a plurality of nodes used to transport the source routing packet from a source to a destination.

15. The computer program product of claim 11, wherein a nodal source of randomization and source routing forwarding operation is used to assign one of the routes to forward the source routing packet.

16. The computer program product of claim 11, wherein the source routing packet comprises the payload, and wherein the payload is not used to directly assign one of the routes to forward the source routing packet.

17. An apparatus for selecting a path using source routing, comprising:
- a receiver configured to receive a source routing packet comprising an entropy-header and a payload;
- a processor coupled to the receiver, wherein the processor is configured to:
    - determine whether a current identifier (ID) located within the entropy-header identifies a single route or more than one next hop routes;
    - select one of the next hop routes as a forwarding route using an entropy value in an entropy field within the entropy-header when the current ID identifies the more than one next hop routes, wherein the entropy value is generated based on the payload of the source routing packet using a function having at least one mathematical operation over a subset of bits in the payload, wherein the entropy field is located at a beginning of the entropy-header of the source routing packet when forwarded; and
    - assign the single route identified by the current ID as a forwarding link when the current ID identifies the single route; and
- a transmitter coupled to the processor, wherein the transmitter is configured to transmit the source routing packet via the forwarding route to a next hop node when the one of the next hop routes is selected and to transmit the source routing packet via the single route to the next hop node when the single route is assigned,
- wherein the entropy-header explicitly lists an end to end route for the source routing packet.

18. The apparatus of claim 17, wherein the entropy-header comprises a list of IDs, wherein the entropy field is located before the list of IDs within the entropy-header, and wherein the current ID is part of the list of IDs.

19. The apparatus of claim 17, wherein the entropy value within the entropy field is the same for packets that correspond to the same flow.

\* \* \* \* \*